United States Patent [19]
Garrison et al.

[11] Patent Number: 5,890,743
[45] Date of Patent: Apr. 6, 1999

[54] PROTECTED CARD INTERMEDIATE AND METHOD

[75] Inventors: Ronald R. Garrison, Batavia; Janusz Szczepaniec, Willow Spring, both of Ill.

[73] Assignee: Wallace Computer Services, Inc., Lisle, Ill.

[21] Appl. No.: 607,214

[22] Filed: Apr. 26, 1996

Related U.S. Application Data

[63] Continuation-in-part of Ser. No. 159,294, Nov. 30, 1993, abandoned, and a continuation-in-part of Ser. No. 198,612, Feb. 18, 1994, Pat. No. 5,466,013.

[51] Int. Cl.$^6$ .................................................. B42D 15/00
[52] U.S. Cl. .......................... 283/109; 283/107; 283/904
[58] Field of Search .............................. 283/72, 94, 107, 283/109, 111, 112, 75, 904; 462/6, 17, 26

[56] References Cited

U.S. PATENT DOCUMENTS 3,069,793  12/1962  Francescon .
4,982,894  1/1991  Schmidt .
4,986,868  1/1991  Schmidt .
5,466,013  11/1995  Garrison .

*Primary Examiner*—Willmon Fridie, Jr.
*Attorney, Agent, or Firm*—Lee, Mann, Smith, McWilliams, Sweeney & Ohlson

[57] ABSTRACT

An assembly and method for making a card intermediate in which a series of spaced apart two layer laminates are arranged with the layers in face-to-face relation with a rupturable adhesive therebetween and a first of the layers being a transparent film, advancing the laminates toward a uniting station, providing a length of imprintable material having first and second surfaces with spaced areas of release material on the first surface and advancing the length toward the uniting station, adhesively uniting in the station the first layer of the series of laminates to the length in said spaced areas with each laminate extending beyond its united areas, and diecutting the length and the first layer to provide a generally rectangular closed perimeter diecut, the diecut also having a segment terminating short of the first layer and dividing the perimeter into two equal portions with one of the portions being within the area.

21 Claims, 2 Drawing Sheets

PROTECTED CARD INTERMEDIATE AND METHOD

This application is a continuation-in-part of application Ser. No. 08/159,294 filed Nov. 30, 1993, now abandoned in favor of continuation Ser. No. 08/512,998 filed Aug. 9, 1995, and also is a continuation-in-part of application Ser. No. 08/198,612 filed Feb. 18, 1994, now U.S. Pat. No. 5,466, 013.

BACKGROUND AND SUMMARY OF INVENTION

This invention relates to a protected card intermediate and method and, more particularly, to a product and process which results in an encased card—as for an I D card or the like.

Protected cards have been known for a considerable time. In U.S. Pat. No. 3,069,793, a protected card was disclosed 35 years ago that made use of a card adapted to receive inscriptions on the exposed top surface thereof, a thin flexible film of a translucent material underlying the card and dimensioned to correspond to the width of the card and about twice the length thereof with the card positioned to one side of the center line of the film, a pressure-sensitive adhesive layer covering the entire surface of the film to adhere to back side of the card to the film on one side, and a removable protective backing covering the exposed portion of the pressure-sensitive adhesive coated film and releasably bonded thereto by the pressure-sensitive adhesive. Thus, the exposed film could be folded over to cover the top surface of the card.

More recently, this concept was carried forward in co-owned U.S. Pat. Nos. 4,982,894 and 4,986,868. In the '894 patent, the protected card is provided as part of a mailer, i.e., a stuffed, sealed envelope assembly. In the '868 patent, the method includes removing one half of a release liner web covering an adhesive-equipped film.

According to the instant invention, a protected card is provided in the form of an intermediate which includes a length of imprintable material having top and bottom surfaces and a generally rectangular diecut extending therethrough to define a card, a laminate adhesively secured to the bottom surface and extending beyond the diecut on all sides thereof. The laminate includes first and second layers adhesively united in superposed relation with the first layer being a transparent film positioned in contact with the bottom surface and the second layer being positioned remote from the bottom surface. The diecut extends through the first layer but not through the second layer. The diecut further includes a segment dividing the material into two equal portions with the segment terminating short of the first layer. A release material is interposed between the intermediate material and laminate on one of the two equal portions. The inventive method includes providing a series of the aforementioned laminates and a web or length of the imprintable material equipped with spaced areas of release material. The series of laminates and web are united with a laminate extending over and beyond a confronting release material area. Thereafter the diecutting is performed to give the generally rectangular card bisected as above.

Other objects and advantages of the invention can be seen in the ensuing specification.

BRIEF DESCRIPTION OF DRAWING

The invention is described in conjunction with the accompanying drawing in which.

DETAILED DESCRIPTION

Generally speaking, the invention makes use of a business form (either sheeted or continuous with line holes) having one or more cards incorporated in it. An especially advantageous use of the invention is in connection with an I D card and, therefore, the ensuing description is set forth in that context but it should be appreciated that a wide variety of cards can benefit from the use of the invention.

Figure 1:
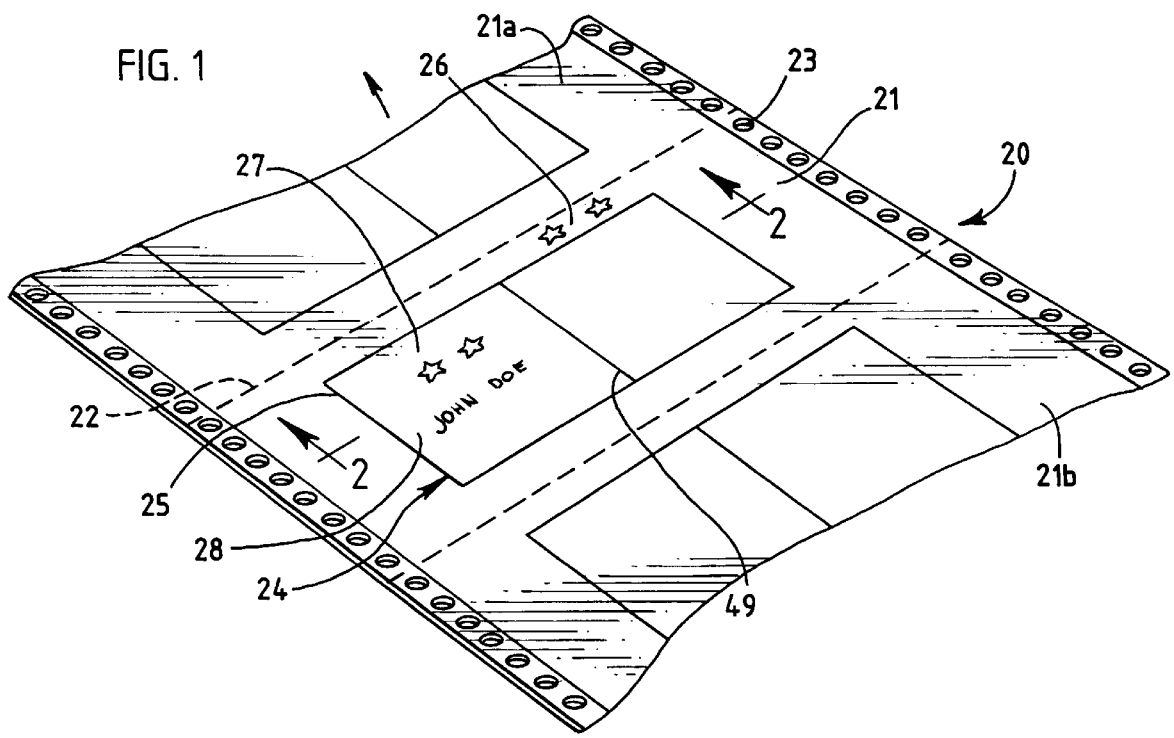
FIG. 1 is a perspective view of a length of imprintable material useful as the inventive intermediate.

Referring to FIG. 1, the numeral 20 designates generally a string of interconnected business form lengths as at 21, 21a, 21b, etc. Each form length is defined between transverse lines of perforation as at 22 and may be equipped, at least along one longitudinal edge, with line holes as at 23. The card is generally designated 24 and is defined by a closed perimeter diecut 25 which generally defines a rectangular outline.

When the form length 21 is used for an I D card, it generally has two types of printed indicia thereon. One type of printed indicia designated 26 and can have to do with the sponsor of the card. It also may be present as at 27 in one portion of the card 24. The second type of printed indicia is designated 28 and may relate to the intended user of the card—as, for example, I D information—and this is normally only on the card itself.

Figure 2:
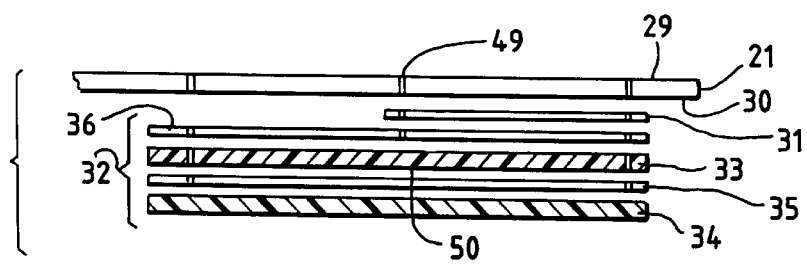
FIG. 2 is a fragmentary sectional view taken along the sight line 2—2 of FIG. 1.

The construction according to the invention makes use of the form length 21 as seen in FIG. 2 and has an upper or top surface 29 and a bottom or lower surface 30. Applied to the lower surface 30 is a patch or area of release material 31 such as silicone. Overlying this area 31 and extending beyond is a laminate generally designated 32. This confronts the surface 30 of the form 21. The laminate 32 includes first and second layers as at 33 and 34 joined together by a dry adhesive 35. This adhesive is readily rupturable to separate the plies. Such a laminate is commercially available from 3-Sigma located at Columbia, S.C. under Product No. 90906-546. Such a laminate has been used in the past in connection with coupon-bearing business forms but not of the card type described herein.

Figure 3:
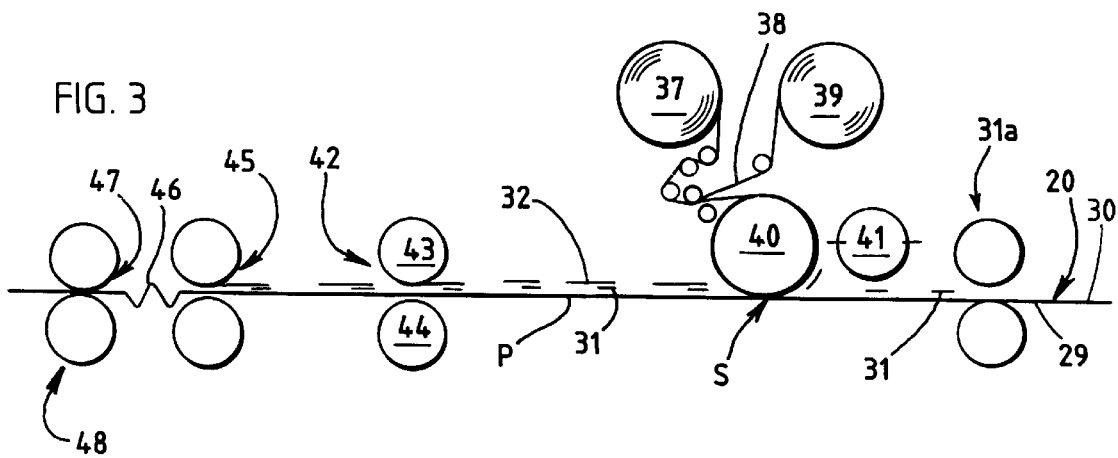
FIG. 3 is a schematic side elevational view of apparatus useful in the practice of the inventive method.

Also seen in FIG. 2 is a layer 36 of pressure sensitive adhesive which is advantageously provided initially as part of the laminate 32—as can be explained more readily with reference to FIG. 3.

INVENTIVE METHOD

In general, this makes use of a variety of commercially available laminates 32 applied as a patch on the back or underside of the form through the use of pressure sensitive adhesive. The form is then diecut from the front or upper side over this patch. The diecut is continuous with no bonds in it and the shape of the diecut is that of a typical card—and may have rounded corners. The perimeter diecut 25 goes through all the sheets of material down to but not through the last layer of the laminate 32. After the form is printed on any type printer, the card can be removed from the form.

The inventive method is shown in greater detail in FIG. 3 and reference is made thereto. Starting at the extreme right of FIG. 3, the numeral 20 again designates generally the length of paper which provides the form lengths 21 and also has surfaces 29 and 30. However, these surfaces are reversed from the showing in FIG. 2—the laminate patch 32 relatively being applied to what is now the upper surface 30 as seen in FIG. 3. This is a matter of convenience in layout—as applying operations are normally performed from above.

The first operation or step performed on the web providing lengths 21 is the application of the spaced areas of release material 31. Conventionally, this may take the form of a silicone compound which has the capability of receiving an adhesive as at 36 but which permits the adhesive to leave with an oppositely-positioned substrate. Here, this substrate is the layer 33 which is a transparent film.

As the web 20 travels along the longitudinally extending path P, the release material is laid down in longitudinally spaced areas as at 31—as seen in the right hand portion of FIG. 3. This can be advantageously achieved through the use of a roll coater generally designated 31a.

Next is encountered a uniting station generally designated S where a laminate 32 is laid down over and united with the web in a part of the web in which a portion contains the release material area 31.

Above the horizontal path P along which the web 20 travels is an unwind 37 which is equipped with the laminate 32. Inasmuch as this is purchased commercially, it is equipped with the pressure sensitive adhesive 36 previously referred to in connection with FIG. 2. Overlying that is a release liner 38 which is continuously removed from the laminated web emanating from the unwind 37. The no longer needed release liner 38 is then rewound into a roll 39 for disposition.

As the reel of laminate is unwound, it has the pressure-sensitive adhesive 36 facing upwardly and the layer 34 contacts and passes over a rotating vacuum roll 40 which is rotating faster than the web being unwound from the roll 37. There is a sliding contact between the web and the roll 40. Positioned next to the vacuum roll 40 is a cutoff roll 41 which severs the laminated layers and adhesive into the discrete patches or laminates 32. Then, as these are spaced longitudinally by virtue of the faster speed of the vacuum roll 40, they are adhered to the web 20 by virtue of the pressure-sensitive adhesive 36 being in face-to-face contact with the web 20.

Thereafter, the web encounters the diecutting station generally designated 42 and which includes an anvil roll 43 and a die roll 44. This provides the diecut 25 after which the forms can be transversely perforated by the perforator generally designated 45 to define the across perforation lines 22.

Thereafter, the continuous form string may be ziz-zag or fan folded as at 46 and transported to a second site 47 where it is printed by printer 48 with the information 28 specific to the intended user.

An advantageous feature of the invention is the additional or segmental diecut 49 as seen in the central portions of both FIGS. 1 and 2. This is advantageously formed at the same time the perimeter, generally rectangular diecut 25 is developed. However, there is a difference between the perimeter diecut 25 and the segment diecut 49. The diecut 49 does not go through the layer 33 which is the transparent film layer. This permits the transparent film 33 to be folded as at 150 (see FIG. 8) after removal of the card half 151 so as to move into covering relation with the card half 152 in the completed assembly seen in FIG. 9.

Once the assembly of FIG. 2 has been achieved, it is generally suited for imprinting if this has not been already performed. In some cases, the web 20 may be unwound from an already printed web roll. In other cases, it may be printed on line as seen in FIG. 3 and without the interposition of the fan-folding operation designated 46. In some other cases, the printing may be performed at a second site, viz., at the plant of a customer of the manufacturer of the FIGS. 1 and 2 assemblies. Even further, after the imprinting just referred to—at either the first or second site, there can still be information added—as in the form of a signature by the ultimate recipient and this can occur at a still further or third site if there is printing, for example, at a second site.

Figure 4:
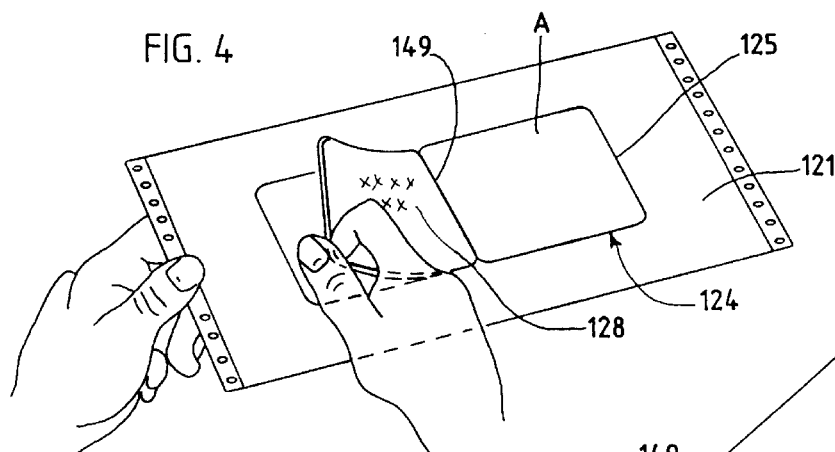
FIG. 4 is a perspective view illustrating the first step in developing a card such as an I D card from the length of FIG. 1.

FIG. 4 represents the manipulation of the inventive assembly after variable information has been applied as at 128—as for example, the signature of the recipient of the form 121 carrying the card 124 defined by the perimetric diecut 125 and which includes the segmental diecut 149 but differing from the diecut of FIG. 1 in having rounded corners—hence the use of numerals increased by 100.

Figure 5:
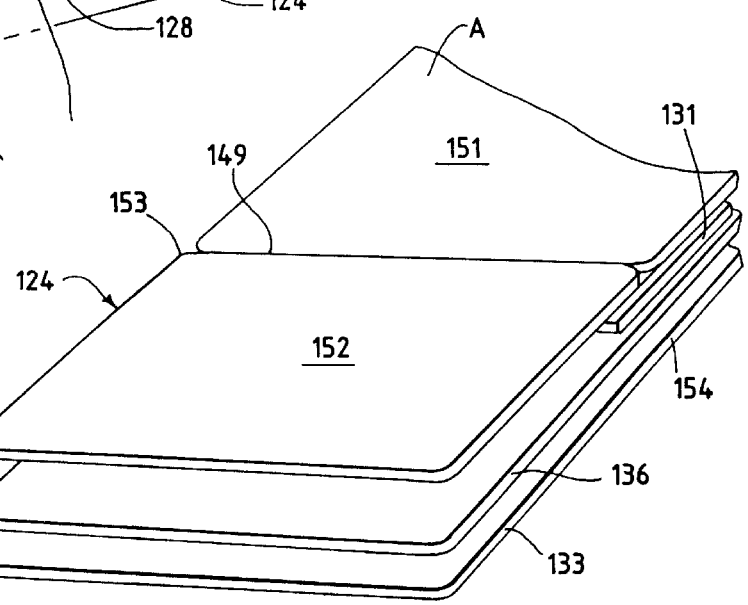
FIG. 5 is a fragmentary perspective view of the card removed from the length of FIG. 4.

In FIG. 4, the hands of the recipient are seen and are in a position wherein the recipient is removing the assembly A from the length 121. The assembly A can be seen in larger form in FIG. 5 and includes the card generally designated 124 defined by the perimeter diecut 125 and which includes a first portion 151 and a second portion 152—defined in part by the segment diecut 149. As this card is to have rounded corners, the segmental diecut 149 has rounded V-shaped ends as at 153—see FIG. 5.

At this point, it will be noticed that the upper layer 133 of transparent film 133 has not been severed by the segmental diecut as at 149 relative to the length 121. The unsevered area is designated 154 at the right of FIG. 5 and is adjacent an edge of the release material area 131. As before, the upper layer 133 is equipped with its pressure-sensitive adhesive layer 136 binding the layer 133 to the underside of the portion 152.

Figure 6:
FIG. 6 is a schematic sectional view of the construction of FIG. 5 and indicating the next step to be performed in developing the ultimate card.
Figure 7:
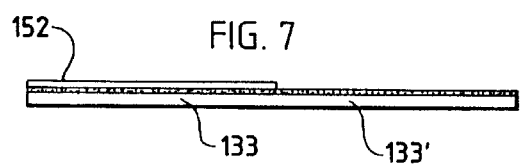
FIG. 7 is a schematic sectional view showing the result of the step indicated in FIG. 6.
Figure 8:
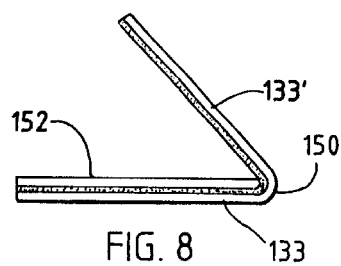
FIG. 8 is a schematic sectional view indicating the next step to be performed in achieving the card.
Figure 9:
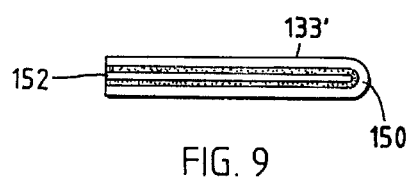
FIG. 9 is a schematic sectional view of the card resulting from the FIG. 8 operation.

After the portion 151 has been removed as illustrated in FIG. 6 and which results in the modified assembly of FIG. 7, the film 133 is folded around the line 150 as illustrated in FIG. 8 to bring the folded portion 133' into covering relation with the portion 152.

A number of advantages flow from the practice of the invention. By having a differential diecut in the segment 49, 149, and a release coating 31, 131 under the portion 151, we are able, to obtain a substantial increase in the thickness of the ultimate card—and this without increasing the thickness of the form, i.e., the imprintable material 10 making up the card per se. Thus, we provide a stiffer card by virtue of having thickness increased from 2 to 4 mils more and this without changing the specification or construction of the card itself. Not only is increasing the thickness of the card material 20 more costly but makes the entire web harder to go through a computer printer. Even further, there is a minimization of "stack lean" which is avoided by virtue of not having thicker patches or additions at one part of a sheet. And, in the way we practice our invention, we preserve the opportunity of obtaining legible printing because the protecting laminating film 133' is not applied until after all imprinting and information providing steps have been performed.

The invention can be practiced with a wide variety of materials. For example, the length 21 can be provided in roll, sheet, etc. form and constructed of paper or many varieties of synthetic material such as polyesters. It is only desirable to have the material ink receptive and by that we include the application of toner of being a form of printing. In fact, any substrate suitable for processing through a computer printer is properly useful in the practice of our invention.

Normally the web providing the ultimate card blank or intermediate 24 will be equipped with control punch margins as seen in FIG. 1 which are subsequently trimmed from the larger form when the form is distributed for ultimate consumption.

The release material 31 is advantageously a patch of silicone or like material on one-half of the diecut assembly. It is within the purview of the invention to utilize any suitable release material.

Still focusing on FIG. 2, the third layer down is advantageously a pressure-sensitive adhesive 36 which is provided as part of the laminate 32. This remains tacky until the operation depicted in FIG. 8 is completed.

The fourth layer down is a transparent film which is foldable over the portion 152 after the portion 151 has been removed.

The fifth layer down is the rupturable adhesive 35 which also is sometimes called a dry adhesive which will permit, upon standing, the separation of the confronting substrates without adherence of adhesive in any tacky aspect to either of the confronting surfaces.

The sixth layer down is the lower layer of the laminate designated 34 which does not require transparency inasmuch as it remains with the length 11 when the operation indicated in FIG. 4 is performed.

SUMMARY

The inventive card intermediate 20 includes a length 21, 121 of imprintable material having top and bottom surfaces 29, 30 and generally rectangular diecut 25, 125 extending therethrough to define a card. Further included is a laminate 32 adhesively secured to the bottom surface 30 and extending beyond the diecut 25, 125 on all sides thereof. The laminate includes first and second layers 33, 34 adhesively united in superposed relation with the first layer 33 being a transparent film positioned in contact with the bottom surface 30 and the second layer 34 being positioned remote from the bottom surface 30. The diecut extends through the first layer 33 but not through the second layer 34. The diecut further includes a segment 49, 149 dividing the material 21, 121 into two equal portions 151, 152 and the segment 49,149 terminates short of the first layer 33. A release material 31 is interposed between the material 21, 121 and laminate 32 on one 151 of the two equal portions 151, 152.

The top surface 29 within the diecut 25, 125 can be equipped with informational indicia as at 27, 28. Further, the informational indicia is preferably on at least the other portion 152 of the two equal portions 151, 152. Still further, the card intermediate has informational indicia which includes at least first and second printed indicia.

The card intermediate of the invention also includes a plurality of lengths 21, 21a, 21b which are provided in a connected series. In such a case, a printed indicia is the same in each length and a second printed indicia has a varying characteristic from length to length.

The card intermediate of the invention may provide a length equipped with diecuts in side-by-side relation to define two cards, the laminate extending beyond both said diecuts.

The card intermediate of the invention can provide a length including a plurality of diecuts arranged in equally longitudinally spaced relation. In such a case, the length can be zig-zag folded between longitudinally spaced diecuts or it can be convolutely rolled. Also, the length of the diecut 25 may extend transversely as shown in FIG. 1 as longitudinally, if desired.

The card intermediate of the invention utilizes to advantage a dry adhesive 35 interposed between the first and second layers 33, 34, the dry adhesive being rupturable upon exertion of a removal force on the card 24 whereby the first layer 33 remains with the card when the card is removed from said length.

In the invention the segmental diecut 49, 149 is generally a line segment but also may be equipped with rounded V-shaped ends merging into the generally rectangular diecut.

In further summary of the invention, the method for making a card intermediate includes the steps of providing a laminate having two layers 33, 34 arranged in face-to-face relation with a rupturable adhesive 35 therebetween and with a first 33 of the layers being a transparent film. The invention further provides a length of imprintable material 21 having surfaces 29, 30 with an area of release material 31 on the surface 30. A further step in the practice of the inventive method is the adhesively uniting of the laminate 32 to the surface 30 to position the first of the layers 33 adjacent the surface 30 and in confronting relation to the area 31.

Then, we diecut the length and the first of the layers to provide a generally rectangular closed perimeter diecut 25, 125 and also having a segment 49, 149 terminating short of the first layer 33 and dividing the perimeter into two equal portions 151, 152 with one 152 of the portions being within the area 31.

While in the foregoing specification a detailed description of an embodiment of the invention has been set down for the purpose of illustration, many variations in the details hereingiven may be made by those skilled in the art without departing from the spirit and scope of the invention.

We claim:

1. A card intermediate comprising a length of imprintable material having top and bottom surfaces and generally rectangular diecut extending therethrough to define a card, a laminate adhesively secured to said bottom surface and extending beyond the diecut on all sides thereof, said laminate including first and second layers adhesively united in superposed relation, said first layer being a transparent film positioned in contact with said bottom surface and said second layer being positioned remote from said bottom surface, said diecut extending through said first layer but not through said second layer, said diecut further including a segment dividing said material into two equal portions and said segment terminating short of said first layer, and a release material interposed between said material and laminate on one of said two equal portions.

2. The card intermediate of claim 1 in which said length top surface within said diecut is equipped with informational indicia.

3. The card intermediate of claim 1 in which said informational indicia is on at least the other of said two equal portions.

4. The card intermediate of claim 3 in which said informational indicia includes at least first and second printed indicia.

5. The card intermediate of claim 4 in which a plurality of said lengths are provided in a connected series, said first printed indicia being the same in each length and said second printed indicia having a varying characteristic from length to length.

6. The card intermediate of claim 1 in which said length is equipped with two diecuts in side-by-side relation to define two cards, said laminate extending beyond both said diecuts.

7. The card intermediate of claim 1 in which said length includes a plurality of diecuts arranged in equally longitudinally spaced relation.

8. The card intermediate of claim 7 in which said length is zig-zag folded between longitudinally spaced diecuts.

9. The card intermediate of claim 7 in which said length is convolutely rolled.

10. The card intermediate of claim 1 in which a dry adhesive is interposed between said first and second layers, said dry adhesive being rupturable upon exertion of a removal force on said card whereby said first layer remains with said card when said card is removed from said length.

11. A card intermediate comprising a length of imprintable material having top and bottom surfaces and a generally rectangular diecut extending through said surfaces to define a card, a laminate adhesively secured to said bottom surface and extending beyond the diecut on all sides thereof, said laminate including first and second layers adhesively united in superposed relation, said first layer being a transparent film positioned in contact with said bottom surface and said second layer being positioned remote from said bottom surface, said diecut extending through said first layer but not through said second length, said length top surface within said diecut being equipped with first and second printed indicia, a rupturable, dry adhesive being interposed between said first and second film layers to permit separation of both said card and said first layer from both said second layer and said length, said diecut further including a segment dividing said material into two equal portions and said segment terminating short of said first layer, and a release material interposed between said material and laminate on one of said two equal portions.

12. The card intermediate of claim 11 in which said length top surface within said diecut is equipped with informational indicia.

13. The card intermediate of claim 12 in which said informational indicia is on at least the other of said two equal portions.

14. The card intermediate of claim 13 in which said informational indicia includes at least first and second printed indicia.

15. The card intermediate of claim 14 in which a plurality of said lengths are provided in a connected series, said first printed indicia being the same in each length and said second printed indicia having a varying characteristic from length to length.

16. The card intermediate of claim 11 in which said length is equipped with two diecuts in side-by-side relation to define two cards, said laminate extending beyond both said diecuts.

17. The card intermediate of claim 11 in which said length includes a plurality of diecuts arranged in equally longitudinally spaced relation.

18. The card intermediate of claim 17 in which said length is zig-zag folded between longitudinally spaced diecuts.

19. The card intermediate of claim 7 in which said length is convolutely rolled.

20. The card intermediate of claim 1 in which said segment is generally a line segment.

21. The card intermediate of claim 20 in which said line segment is equipped with rounded V-shaped ends merging into said generally rectangular diecut.

* * * * *